United States Patent
Zheng et al.

(10) Patent No.: US 12,340,501 B1
(45) Date of Patent: Jun. 24, 2025

(54) METHOD FOR EVALUATING THE POSSIBILITY OF A CIGARETTE BURNING CONE TO FALL OFF

(71) Applicant: CHINA TOBACCO YUNNAN INDUSTRIAL CO., LTD., Kunming (CN)

(72) Inventors: Han Zheng, Kunming (CN); Hao Wang, Kunming (CN); Zhihua Liu, Kunming (CN); Baoshan Yue, Kunming (CN); Jiao Xie, Kunming (CN); Xu Wang, Kunming (CN); Ying Zhang, Kunming (CN); Jihui Liu, Kunming (CN); Xiaolong Ma, Kunming (CN); Tingting Yu, Kunming (CN); Jianyun Yang, Kunming (CN); Xiaoxi Si, Kunming (CN); Yongfa Gui, Kunming (CN); Jiacheng Zhao, Kunming (CN); Yanfei Shen, Kunming (CN); Jiang Yu, Kunming (CN)

(73) Assignee: CHINA TOBACCO YUNNAN INDUSTRIAL CO., LTD., Kunming (CN)

( * ) Notice: Subject to any disclaimer, the term of this patent is extended or adjusted under 35 U.S.C. 154(b) by 0 days.

(21) Appl. No.: 19/089,441

(22) Filed: Mar. 25, 2025

Related U.S. Application Data

(63) Continuation of application No. PCT/US2024/095674, filed on May 28, 2024.

(30) Foreign Application Priority Data

May 27, 2024 (CN) .......................... 202410663671.X

(51) Int. Cl.
 *G06T 7/00* (2017.01)
 *G06T 7/11* (2017.01)
 *G01M 99/00* (2011.01)

(52) U.S. Cl.
 CPC .............. *G06T 7/0004* (2013.01); *G06T 7/11* (2017.01); *G01M 99/00* (2013.01)

(58) Field of Classification Search
 CPC ......... G06T 7/0004; G06T 7/11; G01M 99/00
 See application file for complete search history.

(56) References Cited

U.S. PATENT DOCUMENTS

| | | |
|---|---|---|
| 11,333,647 B2 | 5/2022 | Li et al. |
| 11,653,692 B2 | 5/2023 | Li et al. |

(Continued)

FOREIGN PATENT DOCUMENTS

| | | |
|---|---|---|
| CN | 106950338 A | 7/2017 |
| CN | 107085075 A | 8/2017 |

(Continued)

OTHER PUBLICATIONS

International Search Report, International Appl. No. PCT/CN2024/095674, Feb. 21, 2025, issued by the China National Intellectual Property Administration (ISA/CN), Beijing, China.

(Continued)

*Primary Examiner* — Bobbak Safaipour
(74) *Attorney, Agent, or Firm* — Central California IP Group, P.C.; Andrew D. Fortney

(57) ABSTRACT

A method for evaluating the possibility of a cigarette burning cone to fall off is disclosed. The method uses a manipulator simulation device to simulate the smoking of a cigarette, and measures the maximum deviation of the cigarette burning cone, and then uses angle summing and averaging to add the maximum deviations of the cigarette burning cones measured for multiple cigarettes and obtain an aver- (Continued)

age value, and then evaluates the possibility of the cigarette burning cone to fall by the average value of the maximum deviations of the cigarette burning cone. The method is new, and compared with an existing method using state information of the cigarette burning cone "falling" and "not falling," the method can more accurately, directly and timely reflect the state of the cigarette burning cone.

8 Claims, 2 Drawing Sheets

(56) References Cited

U.S. PATENT DOCUMENTS

| | | | | |
|---|---|---|---|---|
| 2020/0146337 A1* | 5/2020 | Li | ......................... | A24C 5/3406 |
| 2020/0150102 A1* | 5/2020 | Li | ............................ | G01N 3/34 |
| 2022/0142232 A1* | 5/2022 | Zheng | ................ | G01N 35/0099 |
| 2024/0122229 A1* | 4/2024 | Zheng | .................... | G01N 21/84 |

FOREIGN PATENT DOCUMENTS

| | | | |
|---|---|---|---|
| CN | 111426795 A | | 7/2020 |
| CN | 117516419 A | | 2/2024 |
| CN | 117871776 A | | 4/2024 |
| WO | 2024055342 A1 | | 3/2024 |

OTHER PUBLICATIONS

Written Opinion, International Appl. No. PCT/CN2024/095674, Feb. 11, 2025, issued by the China National Intellectual Property Administration (ISA/CN), Beijing, China.

* cited by examiner

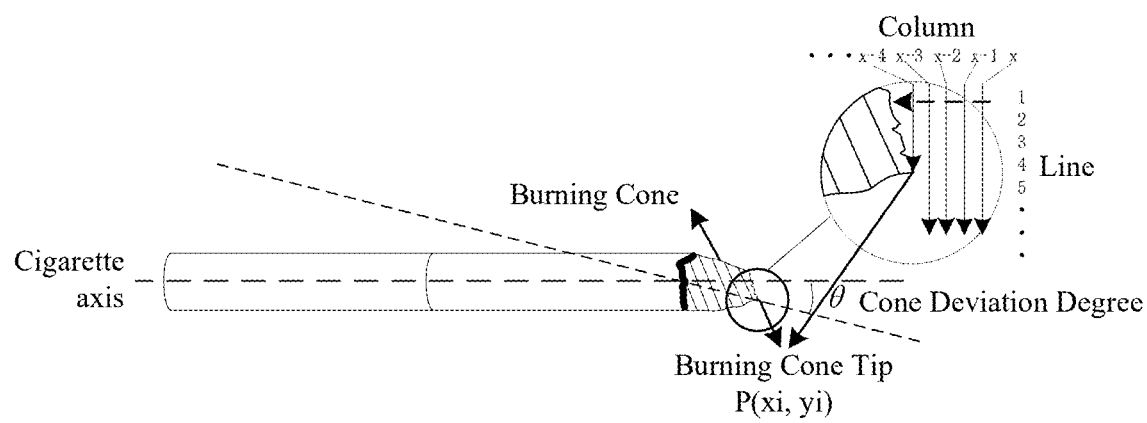
Figure 1
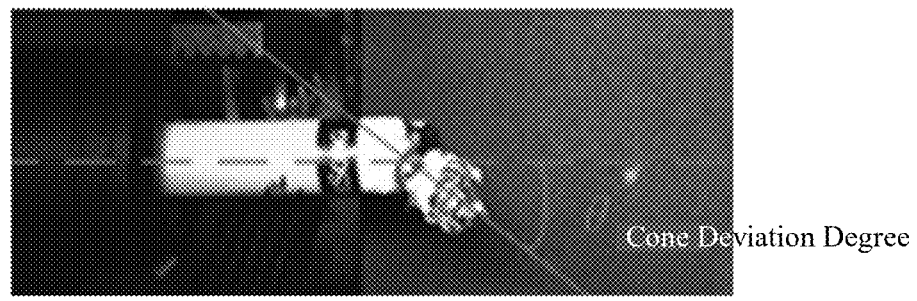
Figure 2
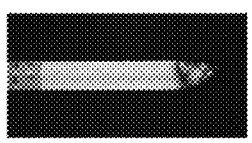 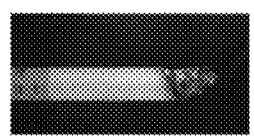 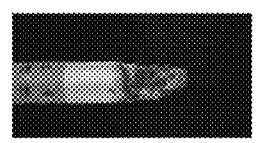
Figure 3A Figure 3B Figure 3C
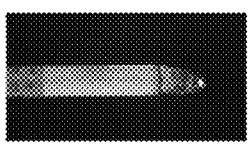 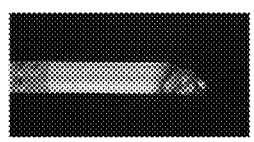 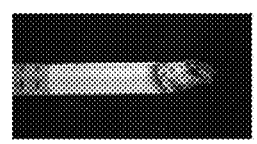
Figure 3D Figure 3E Figure 3F

METHOD FOR EVALUATING THE POSSIBILITY OF A CIGARETTE BURNING CONE TO FALL OFF

CROSS-REFERENCE TO RELATED APPLICATIONS

This application is a continuation of International Pat. Appl. No. PCT/CN2024/095674, filed on May 28, 2024, which claims the benefit of Chinese Pat. Appl. No. 202410663671.X, filed on May 27, 2024, both of which are incorporated herein by reference as if fully set forth herein.

TECHNICAL FIELD

The invention belongs to the technical field of cigarette performance detection, and in particular relates to a method for evaluating the possibility of cigarette burning cone to fall off.

BACKGROUND

With the continuous development of the tobacco industry, the quality and safety of cigarettes, as a mass consumer product, have received increasing attention. Among them, the possibility of cigarette burning cones to fall off is one of the important indicators for evaluating the quality and safety of cigarettes. Therefore, in-depth research on the testing technology of cigarette burning cones to fall off is of great significance for improving cigarette quality, protecting consumer rights and interests, and promoting high-quality development of the industry.

The burning cone of a cigarette falls off when the consumer flicks the cigarette during the puffing process. This phenomenon not only interrupts the puffing, seriously affecting the cigarette consumption experience, but may also cause safety hazards such as fire.

In order to accurately evaluate the possibility of cigarette burning cone to fall, the possibility of cigarette burning cone to fall is usually tested according to the standard YC/T 558, "Test of cigarette burning cone falling possibility." In this standard, the possibility of the cigarette burning cone to fall is evaluated by recording the state information of the cigarette burning cone "falling" and "not falling" during a simulated smoking process. During the test, m cigarette samples are randomly selected as test materials for testing, and the state information of cigarette burning cone "falling" and "not falling" during the simulated smoking process is recorded. Then, the cigarette burning cone falling possibility (CCFP) is calculated according to formula (1), and the result is accurate to 1%.

$$CCFP = n/m \times 100\% \quad (1)$$

wherein:
CCFP: Burning cone fall possibility, %;
n: The number of cigarettes with the burning cone falling off, in pieces (cig);
m: The number of cigarettes tested, in pieces (cig).

In the existing detection methods, although the cigarette burning cone falling possibility (CCFP) can be evaluated by simulating the state information of the cigarette burning cone "falling" and "not falling" during the smoking process, some difficult-to-define problems are often encountered in the actual operation. For example, when simulating the action of human cigarette smoking, we usually set a fixed smoking frequency. According to different standards and smoking modes, the interval time is also different, usually 60 s and 30 s for one puff. In this process, we may encounter a situation: When the burning cone of a cigarette has not completely fallen off, but has only deviated from its original position, the deviated burning cone will be sucked back into the cigarette due to the force of the next puff, and then the re-ignition phenomenon will occur. Although from the perspective of testing, the burning cone has not actually fallen off in this case, when consumers actually puff, facing such a scenario, they are likely to think that the burning cone has fallen off. Therefore, a phenomenon may occur: in laboratory tests, the burning cone of this batch of cigarettes did not have the problem of falling off, but in actual consumer feedback, some people reported that the burning cone would fall off. This difference directly affects the accurate evaluation of the burning performance of cigarettes, resulting in a certain deviation between the test results and the actual experience of consumers. In addition, the existing quantitative indicators of test data are relatively single, and the burning performance of cigarettes is only evaluated by whether the burning cone falls off, which makes it impossible for us to accurately evaluate the potential possibility of the burning cone to fall off the product.

Therefore, in order to solve these problems, it is particularly necessary to conduct in-depth research on the testing technology of cigarette burning cone top falling possibility and propose a new method for evaluating cigarette burning cone top falling possibility.

In order to solve the above problems, the invention is disclosed.

SUMMARY

The present invention aims to overcome the deficiency of the prior art in lacking a method for evaluating the possibility of a cigarette burning cone to fall off, and proposes a new method for evaluating the possibility of a cigarette burning cone to fall off.

The technical solution adopted by the present invention is:
The first aspect of the present invention provides a method for evaluating the possibility of a cigarette burning cone to fall off, wherein a manipulator simulation device is used to simulate smoking of a cigarette, and the maximum deviation of the cigarette burning cone is measured, and then the maximum deviation of the cigarette burning cone is used to evaluate the possibility of the cigarette burning cone to fall off;
The manipulator simulation device comprises a control system, a manipulator, a camera system, an illumination system and a cigarette lighting system;
The control system is connected to the manipulator, the camera system, the illumination system and the cigarette lighting system, respectively, and controls the movement of the manipulator, the operation of the camera system, the illumination system and the cigarette lighting system, and collects and processes the pictures taken by the camera system to obtain the maximum deviation of the cigarette burning cone; the camera system comprises multiple cameras;
The method for evaluating the possibility of cigarette burning cone to fall off comprises the following steps:
Step (1), clamping the cigarette to be tested by a manipulator, wherein the cigarette placed in the clamping position has an axial direction that is perpendicular to a camera of the camera system and a light source of the illumination system; starting the camera system and the illumination system using the control system;

Step (2), starting the manipulator and the cigarette lighting system using the control system, wherein the manipulator and the cigarette lighting system cooperate with a simulated human body to light the cigarette to be tested, then the manipulator inhales, swings an arm and turns a wrist, holds the cigarette at a desk, and flicks the ash according to a cigarette smoking path of the simulated human body, and the camera system collects real-time images of the burning cone of the cigarette after flicking the ash;

Step (3), terminating the test when the burning cone of the cigarette deviates from the central axis of the cigarette;

By processing the burning cone image collected by the camera system at this time, the maximum deviation of the cigarette burning cone in the cigarette burning cone deviation image is determined;

Alternatively, step (3) terminates the test when the cigarette is smoked to the length of the cigarette butt;

Step (4), testing multiple cigarettes according to step (1) to step (3), and using an angle summing and averaging method to add up the maximum deviations of the cigarette burning cones measured for the multiple cigarettes and calculate an average value;

Step (5), evaluating the possibility of the cigarette burning cone to fall off from the average value (e.g., of the maximum deviations of the cigarette burning cones) according to the following:

When the average value of the maximum deviation of the burning cone of the cigarettes is between 0 and 4.0, the burning cone of the cigarettes in this batch has a low possibility to fall off, and the quality of the cigarettes in terms of the burning cone falling off is excellent;

When the average value of the maximum deviation of the burning cone of the cigarettes is between 4.0 and 8.0, the burning cone of the cigarettes in this batch has a rather low possibility to fall off, and the quality of the cigarettes in terms of the burning cone falling off is good;

When the average value of the maximum deviation of the burning cone of the cigarettes is between 8.0 and 12.0, the burning cone of the cigarettes in this batch has a medium possibility to fall off, and the quality of the cigarettes in terms of the burning cone falling off is medium;

When the average value of the maximum deviation of the burning cone of the cigarettes is greater than 12.0, the burning cone of the cigarettes in this batch has a high possibility to fall off, and the quality of the cigarettes in terms of the burning cone falling off is poor.

Preferably, the manipulator is a 6R-type manipulator, and its coordinate system implements a standard coordinate system specified in standard GB/T 16977-2005.

Preferably, the cigarettes to be tested are subjected to sample pretreatment according to standard GB/T 16447 before measurement.

Preferably, simulating cigarette smoking adopts an ISO, FTC, Massachusetts or Canadian deep smoking mode, and the ISO, FTC, Massachusetts or Canadian deep smoking mode includes inhaling once every 60 seconds, 60 seconds, 30 seconds, and 30 seconds, respectively.

Preferably, there are three cameras, which are symmetrically arranged with the cigarette as a center; there are three light sources, which are symmetrically arranged with the cigarette as the center.

Preferably, the control system automatically collects images for processing once every 2 seconds.

Preferably, the camera has a photosensitive element with a size$\geq$15 mm and a phase number with a size$\geq$1.22 μm×1.22 μm; and the light source has a color temperature$\geq$4500 K.

Preferably, processing the cigarette image acquisition in step (3) includes using a pixel-by-pixel scanning method to find the end point of the cigarette burning cone, which includes the following sub-steps:

(1) Collecting and binarizing a cigarette burning image, wherein gray values of the cigarette and the background are distinguished as 255 and 0;

(2) According to a position of the cigarette, cropping the image to a region of interest (ROI) or using an ROI technique to obtain a cropped image with a resolution of x·y;

(3) Starting from an upper right end point (x, 0) of the image, scanning from right to left and from top to bottom, row by row and column by column, and find a first pixel point (xi, yi) with a gray value of Gray=255 from the background row and column pixels. Coordinates of this first pixel point are the coordinates of the vertex of the cigarette burning cone.

In the present invention, the manipulator that simulates the cigarette smoking process and smoking environment, and the method for collecting cigarette burning images by the full-vision camera system can refer to a series of patents based on mechanical vision cigarette burning performance applied for by the Applicant, application No. 2020103139473, entitled "A manipulator that simulates the human body's cigarette smoking process and smoking environment and its simulation method;" and application No. 2020103234251, entitled "A smoking path simulation system based on a robotic arm." Similarly, the test devices and test methods of the above-mentioned patent applications are incorporated by reference into this application.

Compared with the prior art, the present invention has the following beneficial effects:

1. The present invention uses a manipulator simulation device to simulate the smoking of cigarettes, and measures the maximum deviation of the cigarette burning cone, and then uses the maximum deviation of the cigarette burning cone to evaluate the possibility of the cigarette burning cone to fall off. A new method for evaluating the possibility of the cigarette burning cone to fall is provided. Compared with the existing method of evaluating the possibility of the cigarette burning cone to fall by the state information of the cigarette burning cone "falling" and "not falling," the present invention can more accurately, directly and timely reflect the state of the cigarette burning cone.

2. The present invention adopts the angle summing and averaging method to test multiple cigarettes, and then uses the angle summing and averaging method to add the maximum deviations of the cigarette burning cones measured for the multiple cigarettes to obtain the average value, and then evaluates the possibility of the cigarette burning cone to fall by the average value of the maximum deviation of the cigarette burning cone. The evaluation method of the present invention can evaluate the possibility of the cigarette burning cone to fall in a more detailed way, rather than simply the two states of "falling" and "not falling."

3. The method for evaluating the cigarette burning cone falling possibility of the present invention can more accurately evaluate the state of the burning cone of cigarettes, thereby more accurately evaluating the quality and safety of cigarettes, and providing consumers with more reliable products. At the same time, accurately evaluating the burning cone falling possibility of cigarettes is helpful to guide the improvement and optimization of cigarette production processes and improve the overall quality of cigarettes.

DESCRIPTION OF THE DRAWINGS

FIG. 1 is a schematic diagram of the burning cone endpoint scanning.

FIG. 2 is a diagram showing the measured deviation of the burning cone of a cigarette during the test and the degree of deviation of the burning cone.

FIGS. 3A-3F are physical images of conventional cylindrical cigarette burning cone deviation test samples in Example 1 herein.

EXAMPLES

Figure 4A:
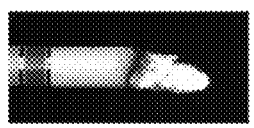
FIGS. 4A-4F are physical images of medium-sized cylindrical cigarette burning cone deviation test samples in Example 2 herein.

The present invention is further described below by way of examples, which are not limited to the examples. Experimental methods for which specific conditions are not specified in the examples are generally carried out under conventional conditions and conditions described in the manual, or under conditions recommended by the manufacturer. The general equipment, materials, reagents, etc. used are all commercially available unless otherwise specified.

The specific steps of the method of the present invention are as follows:

In the examples, when the cigarette burning cone falls directly and does not stick to the test sample cigarette, the deviation of the sample burning cone is specified to be 90 degrees.

Example 1: Conventional Cylindrical Cigarette

1. Test Result

Under the Canadian deep smoking mode standard, conventional cylindrical cigarettes (cigarette diameter: 7.7 mm) were tested for the deviation of the burning cone. Two groups of parallel samples were tested at 40 cigarettes/group. The test results are shown in Table 1.1. Table 1.1 also records the test results using the knocking mode according to YC/T 558. Table 1.2 shows the typical test results and physical pictures of the conventional cylindrical cigarette burning cone deviation test samples.

TABLE 1.1

Test results of conventional cylindrical cigarette burning cone deviation (unit: degrees)

| Sample Group 1 | | | | | | | | | | |
|---|---|---|---|---|---|---|---|---|---|---|
| Number | 1 | 2 | 3 | 4 | 5 | 6 | 7 | 8 | 9 | 10 |
| Cone deviation test value | 1.2 | 1.0 | 1.1 | 2.2 | 1.8 | 1.5 | 1.2 | 1.2 | 3.1 | 2.6 |
| The burning cone falls or not | N | N | N | N | N | N | N | N | N | N |
| Number | 11 | 12 | 13 | 14 | 15 | 16 | 17 | 18 | 19 | 20 |
| Cone deviation test value | 2.3 | 2.3 | 9.9 | 2.2 | 1.8 | 3.3 | 3.4 | 2.9 | 3.0 | 3.1 |
| The burning cone falls or not | N | N | N | N | N | N | N | N | N | N |
| Number | 21 | 22 | 23 | 24 | 25 | 26 | 27 | 28 | 29 | 30 |
| Cone deviation test value | 1.1 | 0.9 | 1.2 | 10.2 | 2.2 | 1.7 | 1.1 | 1.1 | 1.3 | 1.0 |
| The burning cone falls or not | N | N | N | N | N | N | N | N | N | N |
| Number | 31 | 32 | 33 | 34 | 35 | 36 | 37 | 38 | 39 | 40 |
| Cone deviation test value | 2.1 | 2.9 | 0.7 | 0.9 | 1.5 | 3.5 | 2.6 | 2.6 | 3.1 | 1.4 |
| The burning cone falls or not | N | N | N | N | N | N | N | N | N | N |
| Sample group 2 | | | | | | | | | | |
| Number | 1 | 2 | 3 | 4 | 5 | 6 | 7 | 8 | 9 | 10 |
| Cone deviation test value | 1.1 | 1.3 | 0.9 | 1.6 | 1.5 | 1.3 | 2.2 | 2.4 | 2.5 | 3.1 |

TABLE 1.1-continued

Test results of conventional cylindrical cigarette burning cone deviation (unit: degrees)

| The burning cone falls or not | N | N | N | N | N | N | N | N | N | N |
|---|---|---|---|---|---|---|---|---|---|---|
| Number | 11 | 12 | 13 | 14 | 15 | 16 | 17 | 18 | 19 | 20 |
| Cone deviation test value | 3.1 | 1.9 | 6.3 | 3.0 | 1.7 | 2.9 | 2.9 | 1.2 | 1.8 | 1.1 |
| The burning cone falls or not | N | N | N | N | N | N | N | N | N | N |
| Number | 21 | 22 | 23 | 24 | 25 | 26 | 27 | 28 | 29 | 30 |
| Cone deviation test value | 2.6 | 2.4 | 1.5 | 1.3 | 18.1 | 2.6 | 2.9 | 3.1 | 3.3 | 1.3 |
| The burning cone falls or not | N | N | N | N | N | N | N | N | N | N |
| Number | 31 | 32 | 33 | 34 | 35 | 36 | 37 | 38 | 39 | 40 |
| Cone deviation test value | 0.9 | 1.8 | 2.7 | 3.2 | 1.6 | 1.1 | 5.4 | 2.8 | 2.4 | 1.3 |
| The burning cone falls or not | N | N | N | N | N | N | N | N | N | N |

TABLE 1.2

Typical test results and physical images of conventional cylindrical cigarette burning cone deviation test samples (unit: degrees)

| Number | 1 | 2 | 3 |
|---|---|---|---|
| Physical picture | FIG. 3A | FIG. 3B | FIG. 3C |
| Test value | 9.9 | 10.2 | 3.5 |
| Number | 4 | 5 | 6 |
| Physical picture | FIG. 3D | FIG. 3E | FIG. 3F |
| Test value | 6.3 | 18.1 | 5.4 |

2. Evaluation Analysis

The evaluation method adopts an angle test sample angle summing and averaging method for evaluation.

The test values of sample group 1 and group 2 were added together and the average value was obtained to obtain the statistical values in Table 1.3.

TABLE 1.3

Statistical values of burning cone deviation of test samples (unit: degrees)

| Number | Sample Group | Burning cone deviation detection value sum | Average Value |
|---|---|---|---|
| 1 | Sample Group 1 | 94.2 | 2.4 |
| 2 | Sample Group 2 | 106.1 | 2.7 |

Using the statistical values of the test samples, the burning cone falling possibility of the test samples is evaluated and graded according to the evaluation comparison intervals in Table 1.4.

TABLE 1.4

Evaluation range and classification table of conventional cigarette burning cone deviation (unit: degrees)

| | | Evaluation comparison interval and classification | | | |
|---|---|---|---|---|---|
| Number | Sample Group | 0-4.0 Excellent | 4.0-8.0 Good | 8.0-12.0 Medium | >12.0 Poor |
| 1 | Sample Group 1 | √ | — | — | — |
| 2 | Sample Group 2 | √ | — | — | — |

According to Tables 1.3 and 1.4, it can be concluded that the burning cone deviation was used to evaluate sample group 1 and sample group 2, and both groups of samples were excellent. According to the YC/T 558 method (Tobacco Industry Standard of the People's Republic of China, Test of the Burning Cone Falling Possibility of Cigarettes), the burning cone falling possibility of sample group 1 and sample group 2 was calculated to be 0, which shows that the two methods are consistent to a certain extent.

Example 2: Medium-Sized Cylindrical Cigarette

1. Test Result

Under the ISO smoking mode standard, the burning cone deviation test of medium-sized cylindrical cigarettes (cigarette diameter: 6.4 mm) was carried out, with 40 cigarettes/group tested. The test results are shown in Table 2.1. Table 2.1 also records the test results of the knocking mode according to YC/T 558. Table 2.2 shows the typical test results and actual pictures of the burning cone deviation test samples of medium-sized cylindrical cigarettes (unit: degree).

TABLE 2.1

Test results of the deviation of the burning cone of medium-sized cylindrical cigarettes (unit: degrees)

Sample Group 1

| Number | 1 | 2 | 3 | 4 | 5 | 6 | 7 | 8 | 9 | 10 |
|---|---|---|---|---|---|---|---|---|---|---|
| Cone deviation test value | 3.6 | 2.1 | 1.9 | 2.2 | 3.1 | 1.2 | 6.2 | 3.9 | 4.6 | 5.5 |
| The burning cone falls or not | N | N | N | N | N | N | N | N | N | N |
| Number | 11 | 12 | 13 | 14 | 15 | 16 | 17 | 18 | 19 | 20 |
| Cone deviation test value | 2.8 | 3.2 | 2.4 | 12.1 | 5.5 | 6.2 | 2.2 | 1.3 | 2.7 | 1.5 |
| The burning cone falls or not | N | N | N | N | N | N | N | N | N | N |
| Number | 21 | 22 | 23 | 24 | 25 | 26 | 27 | 28 | 29 | 30 |
| Cone deviation test value | 3.1 | 0.9 | 7.9 | 3.9 | 1.2 | 2.7 | 4.4 | 2.6 | 1.4 | 12.0 |
| The burning cone falls or not | N | N | N | N | N | N | N | N | N | N |
| Number | 31 | 32 | 33 | 34 | 35 | 36 | 37 | 38 | 39 | 40 |
| Cone deviation test value | 11.5 | 9.8 | 7.3 | 8.6 | 1.9 | 2.6 | 4.6 | 2.9 | 2.5 | 3.1 |
| The burning cone falls or not | N | N | N | N | N | N | N | N | N | N |

Sample Group 2

| Number | 1 | 2 | 3 | 4 | 5 | 6 | 7 | 8 | 9 | 10 |
|---|---|---|---|---|---|---|---|---|---|---|
| Cone deviation test value | 1.6 | 1.2 | 3.9 | 5.6 | 0.7 | 2.9 | 4.1 | 2.2 | 3.9 | 9.1 |
| The burning cone falls or not | N | N | N | N | N | N | N | N | N | N |
| Number | 11 | 12 | 13 | 14 | 15 | 16 | 17 | 18 | 19 | 20 |
| Cone deviation test value | 6.8 | 3.3 | 2.1 | 1.8 | 2.0 | 3.1 | 7.2 | 4.1 | 11.3 | 8.9 |
| The burning cone falls or not | N | N | N | N | N | N | N | N | N | N |
| Number | 21 | 22 | 23 | 24 | 25 | 26 | 27 | 28 | 29 | 30 |
| Cone deviation test value | 10.2 | 1.4 | 72.6 | 4.6 | 4.9 | 2.5 | 3.4 | 6.8 | 1.7 | 15.5 |
| The burning cone falls or not | N | N | N | N | N | N | N | N | N | N |
| Number | 31 | 32 | 33 | 34 | 35 | 36 | 37 | 38 | 39 | 40 |
| Cone deviation test value | 6.1 | 3.5 | 5.1 | 2.2 | 5.4 | 5.8 | 3.7 | 1.5 | 2.6 | 4.4 |
| The burning cone falls or not | N | N | N | N | N | N | N | N | N | N |

TABLE 2.2

Typical test results and physical images of the sample for the deviation test of the burning cone of a medium-sized cylindrical cigarette (unit: degrees)

Figure 4B:
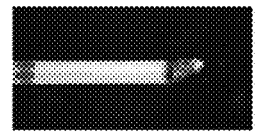
Figure 4C:
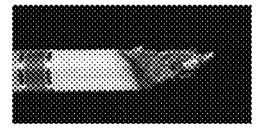
Figure 4D:
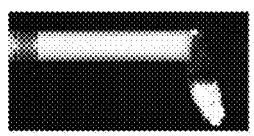
Figure 4E:
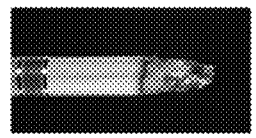
Figure 4F:
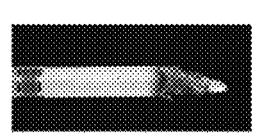

| Number | 1 | 2 | 3 |
|---|---|---|---|
| Physical picture | FIG. 4A | FIG. 4B | FIG. 4C |
| Test value | 12.1 | 12.0 | 11.5 |
| Number | 4 | 5 | 6 |
| Physical picture | FIG. 4D | FIG. 4E | FIG. 4F |
| Test value | 72.6 | 0.1 | 5.8 |

2. Evaluation Analysis

The evaluation method adopts an angle test sample angle summing and averaging method for evaluation.

The test values of sample group 1 and group 2 were added together and the average value was obtained to obtain the statistical values in Table 2.3.

TABLE 2.3

Statistical values of burning cone deviation of test samples (unit: degrees)

| Number | Sample Group | Burning cone deviation detection value sum | Average Value |
|---|---|---|---|
| 1 | Sample Group 1 | 169.1 | 4.2 |
| 2 | Sample Group 2 | 249.7 | 6.2 |

Using the statistical values of the test samples, the burning cone falling possibility of the test samples is evaluated and graded according to the evaluation comparison intervals in Table 2.4.

TABLE 2.4

Evaluation range and classification table of medium-sized cigarette burning cone deviation (unit: degrees)

| | | Evaluation comparison interval and classification | | | |
|---|---|---|---|---|---|
| Number | Sample Group | 0-4.0 Excellent | 4.0-8.0 Good | 8.0-12.0 Medium | >12.0 Poor |
| 1 | Sample Group 1 | — | √ | — | — |
| 2 | Sample Group 2 | — | √ | — | — |

According to Tables 2.3 and 2.4, it can be concluded that the burning cone deviation was used to evaluate sample group 1 and sample group 2, and both groups of samples were good. According to the YC/T 558 method (Tobacco Industry Standard of the People's Republic of China, Test of the Burning Cone Falling Possibility of Cigarettes), the burning cone falling possibility of sample group 1 and sample group 2 were calculated to be 0 and 7.5% respectively. The burning cone falling possibility of the two groups of cigarettes detected by this method were different.

Example 3: Slim Cylindrical Cigarette

1. Test Result

Under the ISO smoking mode standard, the cigarette burning cone deviation test was carried out on slim cylindrical cigarettes (cigarette diameter: 5.4 mm), with 40 cigarettes/group tested. The test results are shown in Table 3.1. Table 3.1 also records the test results using the knocking mode according to YC/T 558.

TABLE 3.1

Test results of the deviation of the burning cone of slim cylindrical cigarettes (unit: degrees)

Sample Group 1

| Number | 1 | 2 | 3 | 4 | 5 | 6 | 7 | 8 | 9 | 10 |
|---|---|---|---|---|---|---|---|---|---|---|
| Cone deviation test value | 2.8 | 2.3 | 1.6 | 1.9 | 2.7 | 2.2 | 3.5 | 4.6 | 5.1 | 6.9 |
| The burning cone falls or not | N | N | N | N | N | N | N | N | N | N |
| Number | 11 | 12 | 13 | 14 | 15 | 16 | 17 | 18 | 19 | 20 |
| Cone deviation test value | 8.9 | 1.0 | 2.9 | 62.0 | 7.3 | 8.5 | 6.1 | 5.4 | 1.2 | 10.1 |
| The burning cone falls or not | N | N | N | N | N | N | N | N | N | N |
| Number | 21 | 22 | 23 | 24 | 25 | 26 | 27 | 28 | 29 | 30 |
| Cone deviation test value | 12.1 | 6.4 | 2.9 | 3.5 | 8.8 | 15.7 | 2.7 | 1.9 | 3.3 | 4.5 |
| The burning cone falls or not | N | N | N | N | N | N | N | N | N | N |
| Number | 31 | 32 | 33 | 34 | 35 | 36 | 37 | 38 | 39 | 40 |
| Cone deviation test value | 8.9 | 14.3 | 11.0 | 2.6 | 5.8 | 4.5 | 7.5 | 13.1 | 12.8 | 4.1 |
| The burning cone falls or not | N | N | N | N | N | N | N | N | N | N |

Sample Group 2

| Number | 1 | 2 | 3 | 4 | 5 | 6 | 7 | 8 | 9 | 10 |
|---|---|---|---|---|---|---|---|---|---|---|
| Cone deviation test value | 3.4 | 10.5 | 8.6 | 2.9 | 5.6 | 4.3 | 7.7 | 10.2 | 11.5 | 2.3 |
| The burning cone falls or not | N | N | N | N | N | N | N | N | N | N |
| Number | 11 | 12 | 13 | 14 | 15 | 16 | 17 | 18 | 19 | 20 |
| Cone deviation test value | 5.1 | 6.6 | 5.8 | 3.1 | 4.9 | 5.1 | 14.8 | 9.5 | 3.7 | 13.1 |
| The burning cone falls or not | N | N | N | N | N | N | N | N | N | N |
| Number | 21 | 22 | 23 | 24 | 25 | 26 | 27 | 28 | 29 | 30 |
| Cone deviation test value | 14.1 | 11.7 | 2.4 | 3.2 | 4.4 | 3.6 | 2.7 | 1.9 | 2.3 | 5.9 |
| The burning cone falls or not | N | N | N | N | N | N | N | N | N | N |

TABLE 3.1-continued

Test results of the deviation of the burning cone of slim cylindrical cigarettes (unit: degrees)

| Number | 31 | 32 | 33 | 34 | 35 | 36 | 37 | 38 | 39 | 40 |
|---|---|---|---|---|---|---|---|---|---|---|
| Cone deviation test value | 10.5 | 2.3 | 4.6 | 6.4 | 7.3 | 6.1 | 11.1 | 8.8 | 10.3 | 12.5 |
| The burning cone falls or not | N | N | N | N | N | N | N | N | N | N |

TABLE 3.2

Typical test results and physical images of the sample for the deviation test of the burning cone of a slim cylindrical cigarette (unit: degrees)

Figure 5A:
FIGS. 5A-5F are physical images of slim cylindrical cigarette burning cone deviation test samples in Example 2 herein.
Figure 5B:
Figure 5C:
Figure 5D:
Figure 5E:
Figure 5F:

| Number | 1 | 2 | 3 |
|---|---|---|---|
| Physical picture | FIG. 5A | FIG. 5B | FIG. 5C |
| Test value | 62.0 | 15.7 | 14.3 |
| Number | 4 | 5 | 6 |
| Physical picture | FIG. 5D | FIG. 5E | FIG. 5F |
| Test value | 11.7 | 14.8 | 11.1 |

2. Evaluation Analysis

The evaluation method adopts an angle test sample angle summing and averaging method for evaluation.

The test values of sample group 1 and group 2 were added together and the average value was obtained to obtain the statistical values in Table 3.3.

TABLE 3.3

Statistical values of burning cone deviation of test samples (unit: degrees)

| Number | Sample Group | Burning cone deviation detection value sum | Average Value |
|---|---|---|---|
| 1 | Sample Group 1 | 293.4 | 7.3 |
| 2 | Sample Group 2 | 270.8 | 6.8 |

Using the statistical values of the test samples, the burning cone falling possibility of the test samples is evaluated and graded according to the evaluation comparison intervals in Table 3.4.

TABLE 3.4

Evaluation range and classification table of slim cigarette burning cone deviation (unit: degrees)

| | | Evaluation comparison interval and classification | | | |
|---|---|---|---|---|---|
| Number | Sample Group | 0-5.0 Excellent | 5.0-10.0 Good | 10.0-15.0 Medium | >15.0 Poor |
| 1 | Sample Group 1 | — | √ | — | — |
| 2 | Sample Group 2 | — | √ | — | — |

According to Tables 3.3 and 3.4, it can be concluded that the burning cone deviation was used to evaluate sample group 1 and sample group 2, and both groups of samples were good. According to the YC/T 558 method (Tobacco Industry Standard of the People's Republic of China, Test of the Burning Cone Falling Possibility of Cigarettes), the burning cone falling possibility of sample group 1 and sample group 2 were calculated to be 5 and 2.5% respectively. There was a certain difference in the burning cone falling possibility of the two groups of cigarettes detected by this method.

The present invention is described above by way of example. It should be noted that, without departing from the core of the present invention, any simple deformation, modification or other equivalent replacement that can be made by those skilled in the art without inventive labor falls within the protection scope of the present invention.

What is claimed is:

1. A method for evaluating a possibility of a cigarette burning cone to fall off, comprising simulating smoking of a cigarette using a manipulator simulation device, measuring a maximum deviation of the cigarette burning cone, and evaluating the possibility of the cigarette burning cone to fall off using the maximum deviation of the cigarette burning cone; wherein the manipulator simulation device comprises a control system, a manipulator, a camera system, an illumination system and a cigarette lighting system;

the control system is connected to the manipulator, the camera system, the lighting system and the cigarette lighting system, and controls movement of the manipulator and operation of the camera system, the lighting system and the cigarette lighting system, and collects and processes pictures taken by the camera system to obtain the maximum deviation of the cigarette burning cone;

the camera system comprises multiple cameras; and the method for evaluating the possibility of cigarette burning cone to fall off comprises the following steps:

Step (1), clamping the cigarette by a manipulator, wherein the cigarette in a clamping position has an axial direction that is perpendicular to a camera of the camera system and a light source of the illumination system, and starting the camera system and the illumination system using the control system;

Step (2), starting the manipulator and the cigarette lighting system using the control system, wherein the manipulator and the cigarette lighting system cooperate with a simulated human body to light the cigarette, the manipulator inhales, swings an arm and turns a wrist, holds the cigarette, and flicks an ash according to a cigarette smoking path of the simulated human body, and the camera system collects real-time images of the burning cone of the cigarette after flicking the ash;

Step (3), terminating the method when the burning cone of the cigarette deviates from the central axis of the cigarette or when the cigarette is smoked to the length of the cigarette butt, and processing the real-time images to determine the maximum deviation of the cigarette burning cone in the real-time images;

Step (4), testing multiple cigarettes according to step (1) to step (3), and then using an angle summing and averaging method to add up the maximum deviations of the cigarette burning cones measured for the multiple cigarettes and calculate an average value;

Step (5), evaluating the possibility of the cigarette burning cone to fall off from the average value according to the following:

when the average value is between 0 and 4.0, the burning cone of the cigarettes has a low possibility to fall off, and a quality of the cigarettes in terms of the burning cone falling off is excellent;

when the average value is between 4.0 and 8.0, the burning cone of the cigarettes has the low possibility to fall off, and the quality of the cigarettes in terms of the burning cone falling off is good;

when the average value is between 8.0 and 12.0, the burning cone of the cigarettes has a medium possibility to fall off, and the quality of the cigarettes in terms of the burning cone falling off is medium; and when the average value is greater than 12.0, the burning cone of the cigarettes has a high possibility to fall off, and the quality of the cigarettes in terms of the burning cone falling off is poor.

2. The method according to claim 1, wherein the manipulator is a 6R-type manipulator, and its coordinate system implements a standard coordinate system specified in standard GB/T 16977-2005.

3. The method according to claim 1, further comprising subjecting the cigarettes to sample pretreatment according to standard GB/T 16447.

4. The method according to claim 1, wherein simulating smoking adopts an ISO, FTC, Massachusetts or Canadian deep smoking mode, and the ISO, FTC, Massachusetts or Canadian deep smoking mode inhales once every 60 seconds, 60 seconds, 30 seconds, and 30 seconds, respectively.

5. The method according to claim 1, wherein the camera system comprises three cameras, symmetrically arranged with the cigarette as a center, and the lighting system comprises three light sources, symmetrically arranged with the cigarette as the center.

6. The method according to claim 1, wherein the control system automatically collects images once every 2 seconds.

7. The method according to claim 1, wherein the camera has a photosensitive element with a size$\geq$15 mm and a phase number with a size$\geq$1.22 µm×1.22 µm, and the light source has a color temperature$\geq$4500 K.

8. The method according to claim 1, wherein processing the real-time images comprises using a pixel-by-pixel scanning method to find an end point of the cigarette burning cone, which includes the following sub-steps:

(1) collecting and binarizing one of the real-time images, wherein gray values of the cigarette and the background are distinguished as 255 and 0;

(2) according to a position of the cigarette, cropping the one of the real-time images to a region of interest (ROI) or using an ROI technique to obtain a cropped image with a resolution of x·y; and (3) starting from an upper right end point (x, 0) of the one of the real-time images, scanning from right to left and from top to bottom, row by row and column by column, to find a first pixel point (xi, yi) with a gray value of Gray=255 from the background row and column pixels, wherein coordinates of the first pixel point are coordinates of a vertex of the cigarette burning cone.

* * * * *